US010110823B2

United States Patent
Shigeta (10) Patent No.: US 10,110,823 B2
(45) Date of Patent: Oct. 23, 2018

(54) POSITION OUTPUT UNIT, AND LENS APPARATUS AND LENS SYSTEM HAVING THE SAME

(71) Applicant: CANON KABUSHIKI KAISHA, Tokyo (JP)

(72) Inventor: Junji Shigeta, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/238,046

(22) Filed: Aug. 16, 2016

(65) Prior Publication Data
US 2017/0064187 A1 Mar. 2, 2017

(30) Foreign Application Priority Data
Aug. 28, 2015 (JP) .................................. 2015-169208

(51) Int. Cl.
*H04N 5/232* (2006.01)
*G02B 15/14* (2006.01)

(52) U.S. Cl.
CPC ......... *H04N 5/23296* (2013.01); *G02B 15/14* (2013.01); *H04N 5/23209* (2013.01)

(58) Field of Classification Search
CPC . H04N 5/23296; H04N 5/23209; G02B 15/14
See application file for complete search history.

(56) References Cited

U.S. PATENT DOCUMENTS

| 2005/0179802 A1* | 8/2005 | Tanaka | H04N 5/222 348/335 |
| 2005/0225874 A1* | 10/2005 | Tanaka | G02B 7/102 359/684 |
| 2006/0012700 A1 | 1/2006 | Tanaka | |
| 2009/0028539 A1* | 1/2009 | Nakahara | G02B 7/38 396/104 |
| 2009/0324208 A1* | 12/2009 | Asano | G02B 5/06 396/55 |
| 2010/0091175 A1* | 4/2010 | Shintani | G02B 7/365 348/345 |
| 2016/0080658 A1* | 3/2016 | Tanaka | G05B 13/04 348/369 |

FOREIGN PATENT DOCUMENTS

| EP | 0989747 A2 | 3/2000 |
| JP | 2000106650 A | 4/2000 |
| JP | 2006030656 A | 2/2006 |

* cited by examiner

*Primary Examiner* — Timothy J Henn
(74) *Attorney, Agent, or Firm* — Rossi, Kimms & McDowell LLP (57) ABSTRACT

A position output unit according to the invention includes a pulse generator that generates a second pulse train signal on a basis of a first pulse train signal output from a position detector that generates the first pulse train signal including a number of pulses representing the displacement amount of a movable member. The pulse generator generates the second pulse train signal in such a way that a second total pulse number defined as a total number of pulses in the second pulse train signal corresponding to a displacement amount of the movable member over an entirety of the movable range is smaller than or equal to a first total pulse number defined as a total number of pulses in the first pulse train signal corresponding to the entirety of the movable range of the movable member.

16 Claims, 9 Drawing Sheets

POSITION OUTPUT UNIT, AND LENS APPARATUS AND LENS SYSTEM HAVING THE SAME

BACKGROUND OF THE INVENTION

Field of the Invention

The present invention relates to a position output unit that outputs position information about a movable member to an external device, and a lens apparatus and lens system having such a position output unit.

Description of the Related Art

Lens apparatuses have movable optical members relating to zoom, focus, and iris, which are moved electrically or manually to produce optical changes, thereby enabling desired image shooting by cameras on which the lens apparatuses are mounted.

Virtual systems that combining an image of a real scene and a computer graphics image associated with the real scene image are widely used.

In the actual use of such a virtual system, position signals about the zoom, focus, and iris are fed to the virtual system. Then, the virtual system generates a computer graphics image that is matched in size, focus position, and brightness with a real scene image by using a computer in the system on the basis of the position information fed to the system. Thus, image combining which the viewer does not feel unnatural can be achieved even when the zoom, focus, and iris are changed in real time.

Japanese Patent Application Laid-Open No. 2000-106650 and Japanese Patent Application Laid-Open No. 2006-30656 disclose lens apparatuses that can be used in the above-described virtual system. The lens apparatuses disclosed in these patent literatures can output a digital pulse train signal generated by a rotary encoder linked with a movable optical member to the external virtual system.

The virtual system has a counter that counts the cumulative count value for pulse count number) of the digital pulse train signal output from the lens apparatus. The virtual system performs calibrating operation for initialing the counter as described in Japanese Patent Application Laid-Open No. 2000-106650, after which the position of the movable optical member can be determined from the pulse count value.

Thus, the virtual system can generate a computer graphics image matched in size, focus position, and brightness with a real scene image by using a computer in the system on the basis of the position information about the movable optical member.

The virtual system has its own maximum pulse count value, which is necessitated by its design constraints.

The number of pulses in a digital pulse train signal corresponding to the entire movable range of a movable optical member of a lens apparatus (i.e. the total pulse number over the movable range) varies depending on the resolution of position detection of a position detector and the movable range of the movable optical member. Therefore, in the case of a lens apparatus having a long movable range of a movable optical member or a lens apparatus equipped with a position detector having high resolution in position detection, the total pulse number over the movable range may exceed the maximum pulse count value.

As described above, a lens apparatus of which the total pulse number over the movable range exceeds the maximum pulse count value of a virtual system encounters the problem that the virtual system cannot determine the position of a movable optical member correctly.

The prior arts disclosed in Japanese Patent Application Laid-Open No. 2000-106650 and Japanese Patent Application Laid-Open No. 2006-30656 teach nothing about the total pulse number over the movable range with a lens apparatus.

SUMMARY OF THE INVENTION

Given the above-described problem, an object of the present invention is to provide lens apparatuses that enable determination of the position of a movable optical member by a virtual system in spite of variations in the resolution of position detection of the position detector and variations in the movable range of the movable optical member among the lens apparatuses.

Another object of the present invention is to provide a virtual system that can determine the position of a movable optical member correctly without performing time consuming calibrating operation at the time of startup of the system.

A position output apparatus according to the present invention comprises a pulse generator that generates a second pulse train signal on a basis of a first pulse train signal output from a position detector that generates the first pulse train signal including a number of pulses representing the displacement amount of a movable member and outputs the second pulse train signal, wherein. the pulse generator generates the second pulse train signal in such a way that a second total pulse number defined as a total number of pulses in the second pulse train signal corresponding to a displacement amount of the movable member over an entirety of a movable range of the movable member is smaller than or equal to a first total pulse number defined as a total number of pulses in the first pulse train signal corresponding to the entirety of the movable range of the movable member.

With the position output unit according to the present invention, the position of a movable optical member can be determined by a virtual system correctly irrespective of variations in the position detection resolution of the position detector of the lens apparatus or variations in the movable range of the movable optical member.

Moreover, the virtual system can determine the position of the movable optical member correctly without performing time-consuming calibration operation at the time of startup of the virtual system.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[First Embodiment]

In the following, a position output unit and a lens system including the position output unit according to a first embodiment of the present invention will be described with reference to FIG. 1.

Figure 1:
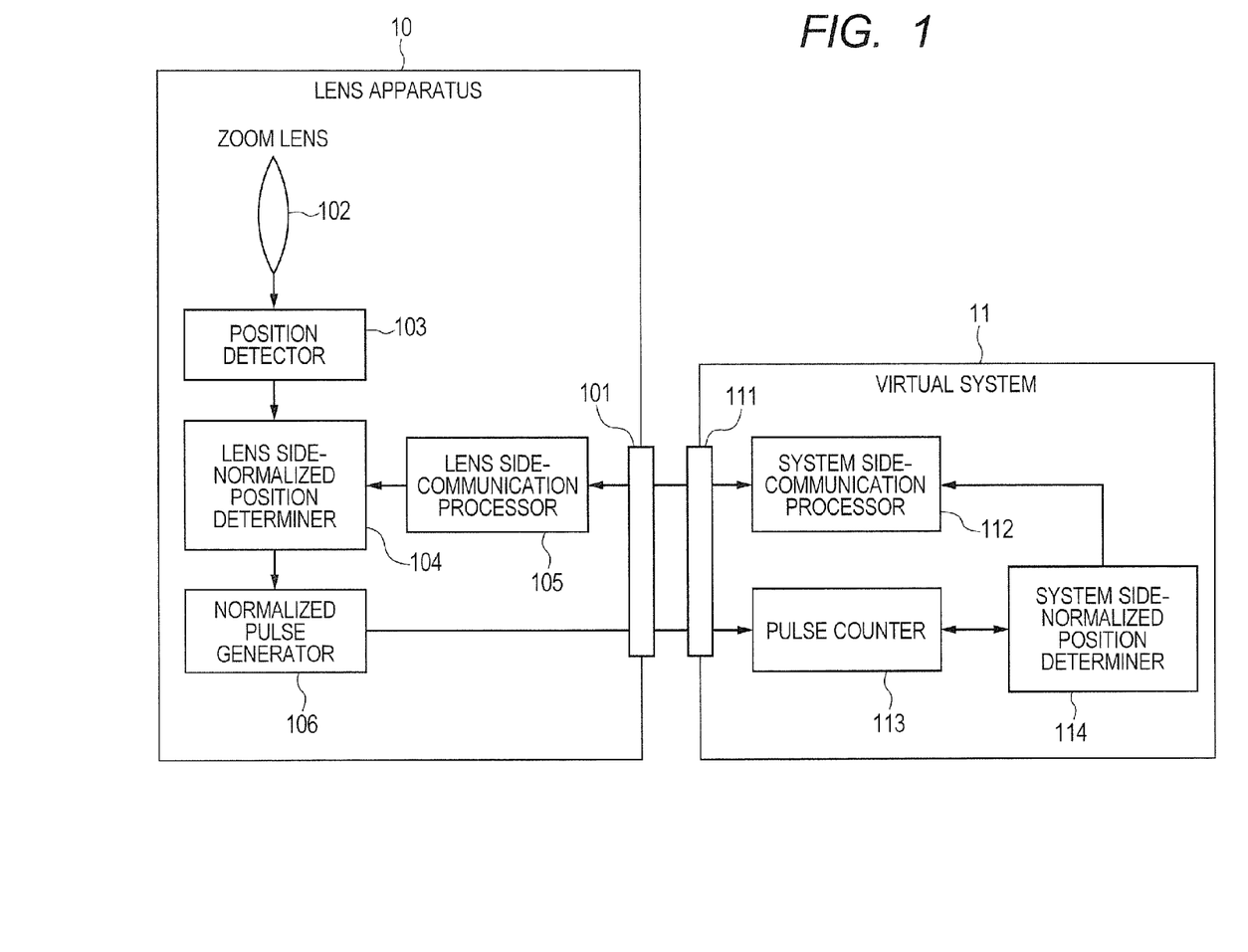
FIG. 1 is a block diagram showing the configuration of a first embodiment.

FIG. 1 is a block diagram of the system according to the first embodiment. FIG. 1 shows a lens apparatus 10 that controls a movable optical member relating to image shooting. FIG. 1 also shows a virtual system. (external device or image combining apparatus) 11 that combines a computer graphics image with a shot image. The lens apparatus 10 and the virtual system 11 are connected through a cable (not shown) with connectors 101 and 111 to constitute a lens system.

The connectors 101, 111 have a contact terminal for transmission of digital pulse train signals output from the lens apparatus 10 and a contact terminal for data communication between the lens apparatus 10 and the virtual system 11. The lens apparatus 10 has a position detector 103 used to detect or determine the position of a zoom lens 102. The position detector 103 is, for example, a potentiometer or a rotary encoder having an original position output, which is linked with the zoom lens 102. The lens apparatus 10 further has a lens-side normalized position determiner 104 that normalizes the position of the zoom lens 102 in the range from the wide angle end to the telephoto end (i.e. the entirety of the movable range of a movable member) and provides the normalized position.

In this specification, we use the term "normalize" along with its derivatives to describe to convert a first variable that varies through a first rage into a second variable that varies through a second range, for the sake of convenience.

The lens apparatus 10 further has a lens-side communication processor 105, which is a communication unit for data communication with the virtual system 11. The data communication is transmission and reception of data sequence performed, in a predetermined communication format according to a serial communication standard such as RS-232C or RS-422, enabling communication of information between the lens apparatus 10 and the virtual system 11. The lens apparatus 10 further has a normalized pulse generator 106 (pulse generator), which generates a digital pulse train signal based on the normalized position of the zoom lens 102 and outputs the digital pulse train signal to the virtual system 11. The lens-side normalized position determiner 104, the lens-side communication processor 105, the normalized pulse generator 106 are configured, for example, in a CPU provided in the lens apparatus 10.

The virtual system 11 has a system-side communication processor 112, which is a communication unit for data communication with the lens apparatus 10. The virtual system 11 further has a pulse counter 113 used to count the cumulative value of the number of pulses in the digital pulse train signal output from the lens apparatus 10. The virtual system 11 further has a system-side normalized position determiner 114, which determines the normalized zoom position on the basis of the cumulative pulse value of the digital pulse train signal. The system-side communication processor 112, the pulse counter 113, the system-side normalized position determiner 114 are configured, for example, in a CPU provided in the virtual system 11.

While FIG. 1 shows only units relating to the zoom lens in the lens apparatus, like units are also provided for each of a focus lens, iris, and optical axis adjustment optical member such as shift lens.

Figure 2:
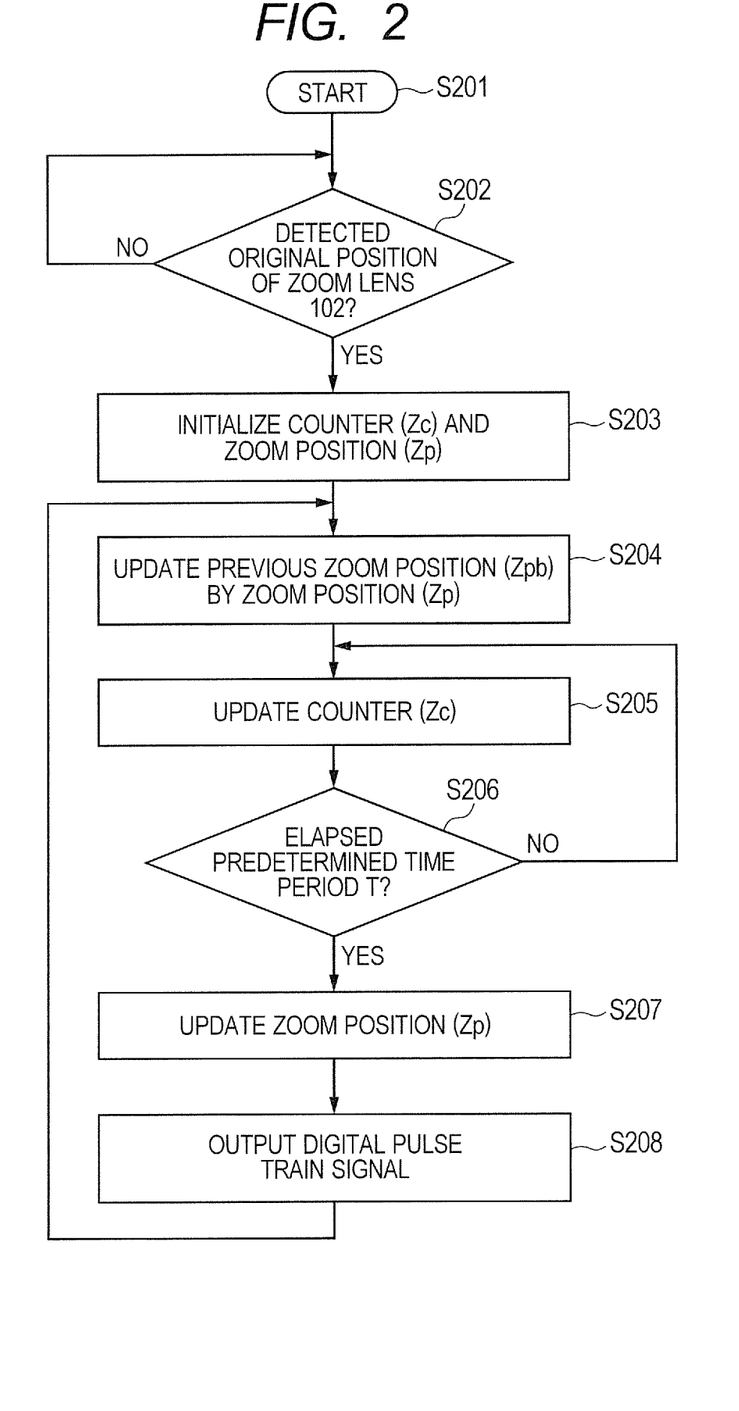
FIG. 2 is a flow chart of processing executed in the lens apparatus according to the first embodiment.

In the following, the flow of processing by which the lens apparatus 10 according to this embodiment outputs position information about the zoom lens 102 as a digital pulse train signal will be described with reference to FIG. 2.

Firstly, we will describe or define values and terms used in the description of the processing flow. Counter Zc is a count value that is increased/decreased by a signal output from the position detector 103. As illustrated FIG. 2 the counter Zc is increased/decreased in accordance with phase-A and phase-B base digital pulse train signals (first pulse train signals) output from the position detector 103. Maximum counter value ZcMax is the amount of change (displacement amount) of the counter Zc resulting from the shift of the zoom lens 102 from the wide angle end position to the telephoto end position. The maximum counter value ZcMax is held in the lens apparatus 10 in advance. Maximum position value ZpMax is a value received from the virtual system 11 through the lens-side communication processor 105 (total pulse number receiver) in conformity with the communication. format.

Zoom position Zp is calculated by the following equation (1):

$$Zp = Zc \times ZpMax \div ZcMax \qquad (1).$$

Since the maximum value of the counter Zc is the maximum counter value ZcMax, the value of the zoom position Zp varies from 0 to the maximum position value ZpMax, as the zoom lens 102 shifts from the wide angle end to the telephoto end.

Predetermined time T is the time by which the interval of execution of the processing of steps S207 and S208 described later is measured. The predetermined time is set as a time long enough to allow output of a digital pulse signal representing the change of the zoom lens 102 to be completed in the processing of step S208 described later.

Previous zoom position Zpb is a value used in calculation of the amount of change in the zoom position Zp over the predetermined time T in the processing of step S208 described later.

The initial zoom position refers to a specific position of the zoom lens 102 at which the position detector 103 outputs an original position detection signal. The initial zoom position may be, for example, the wide angle end position. The zoom lens 102 is linked with a zoom ring (not shown) and can be moved by operating the zoom ring. As the zoom lens 102 is set to the initial zoom position by operation, the position detector 103 outputs an original position detection signal.

Now, the processing flow will be described.

After the lens apparatus 10 is activated, the processing is started in step S201 and then proceeds to step S202.

In step S202, the lens-side normalized position determiner 104 detects whether or not the original position detection signal about the zoom lens 102 is input from the position detector 103. When the original position detection signal is detected, the processing proceeds to step S203. If the original position detection signal is not detected, the processing of step S202 is executed repeatedly.

In step S203, the lens-side normalized position determiner 104 initializes the values of the counter Zc and the zoom position Zp to 0 (zero), and then processing proceeds to step S204. Thus, the counter Zc and the zoom position Zp are set to 0 when the zoom lens 102 is at the initial zoom lens position, after which the counter Zc and the zoom position Zp are increased/decreased with reference to the initial zoom lens position.

In step S204, the normalized pulse generator 106 updates the previous zoom position Zpb by the zoom position Zp. In the first processing after the start, the previous zoom position Zpb is initialized by the zoom position Zp Then, the processing proceeds to step S205.

Figure 3:
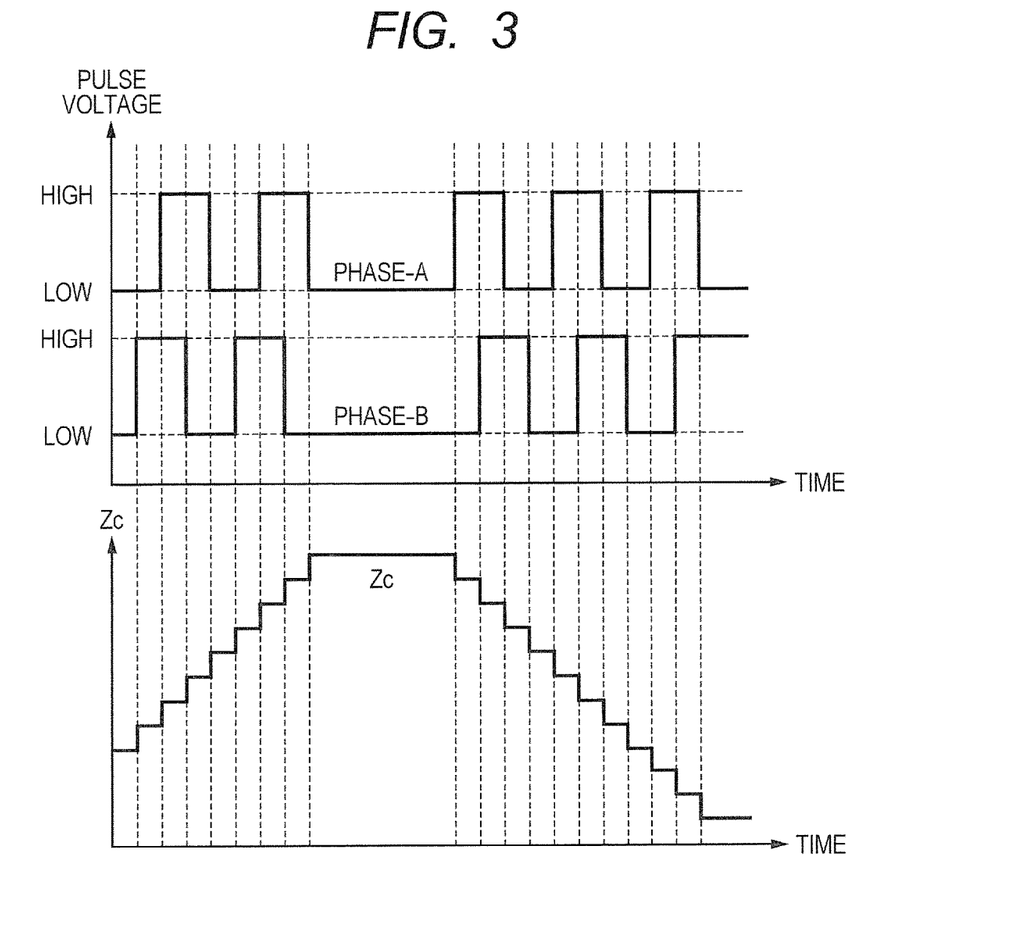
FIG. 3 is a diagram illustrating relationship between a pulse output from a position detector and zoom position counter Zc.

In step S205, the lens-side normalized position. determiner 104 increases or decreases the counter Zc as shown in FIG. 3. Then, the processing proceeds to step S206.

In step S206, the normalized pulse generator 106 determines whether or not the predetermined time T has been elapsed after the advancement of the process from step S204 to S205 or to step S207. If the predetermined time T has elapsed, the processing proceeds to step S207. If the predetermined time T has not elapsed, the process returns to step S205.

In step S207, the lens-side normalized position determiner 104 determines the current zoom position Zp according to equation (1). Then, the processing proceeds to step S208.

Figure 4:
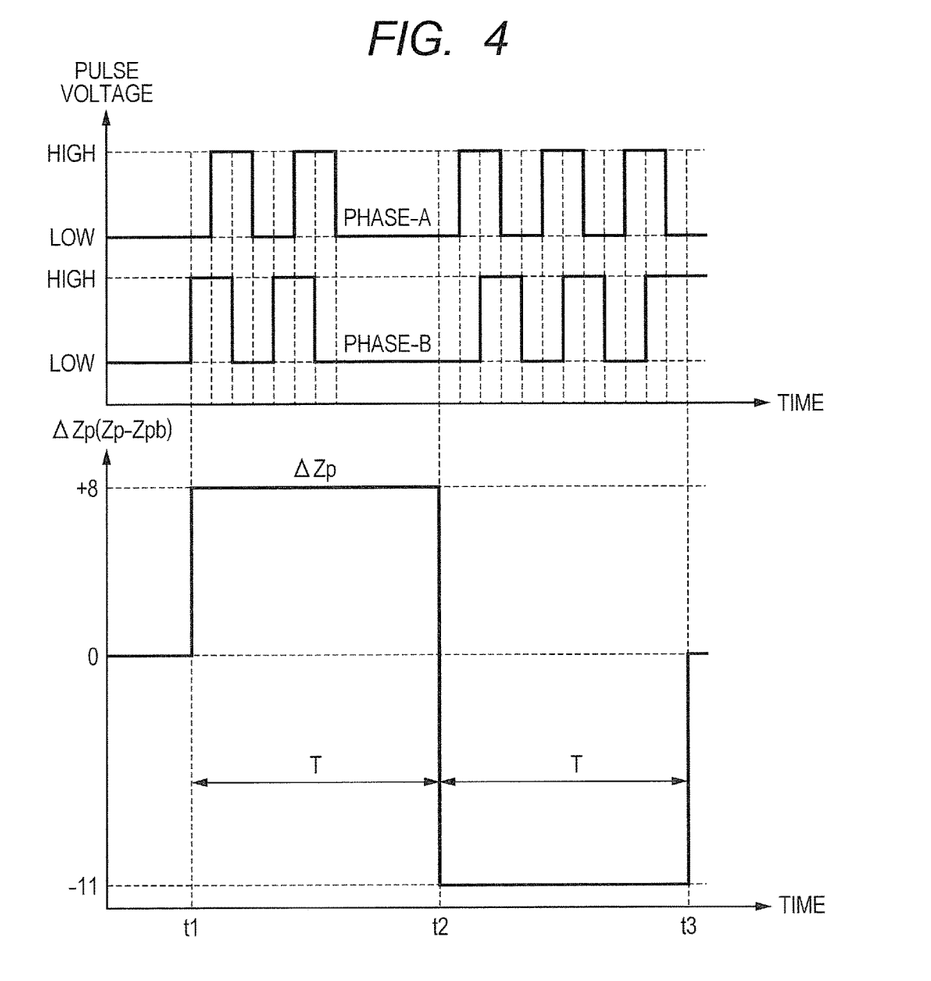
FIG. 4 is a diagram illustrating relationship between a pulse output from the lens apparatus and lens-side normalized zoom position Zp.

In step S208, the normalized pulse generator 106 calculates the amount of change ΔZp of the zoom lens 102 over the predetermined time T from the difference between the zoom position Zp and the previous zoom position Zpb, as shown in FIG. 4. Then, the normalized pulse generator 106 outputs a digital pulse train signal corresponding to the amount of change ΔZp of the zoom lens 102 over the predetermined time T as shown in FIG. 4, to the connector 101. Then, the process returns to step S204. Thus, a digital pulse train signal representing the amount of change of the zoom position Zp is output from the lens apparatus 10 every time the predetermined time T elapses. A digital pulse train signal is output from the lens apparatus 10 on the basis of the amount of shift of zoom over the predetermined time T.

By the above-described process, the lens apparatus 10 can output a digital pulse train signal of which the total pulse number over the movable range is equal to the maximum position value ZpMax set by the virtual system 11.

Figure 5:
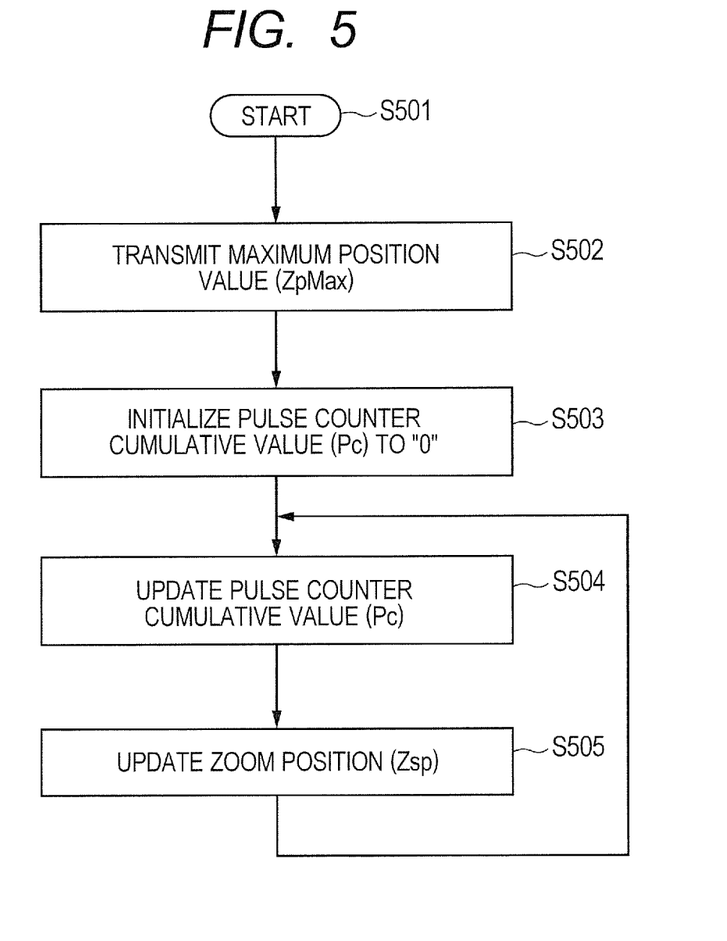
FIG. 5 is a flow chart of processing executed in a virtual system according to the first embodiment.

Next, the flow of processing by which the virtual system 11 according to this embodiment determines the zoom position of the lens apparatus 10 will be described with reference to FIG. 5.

Figure 6:
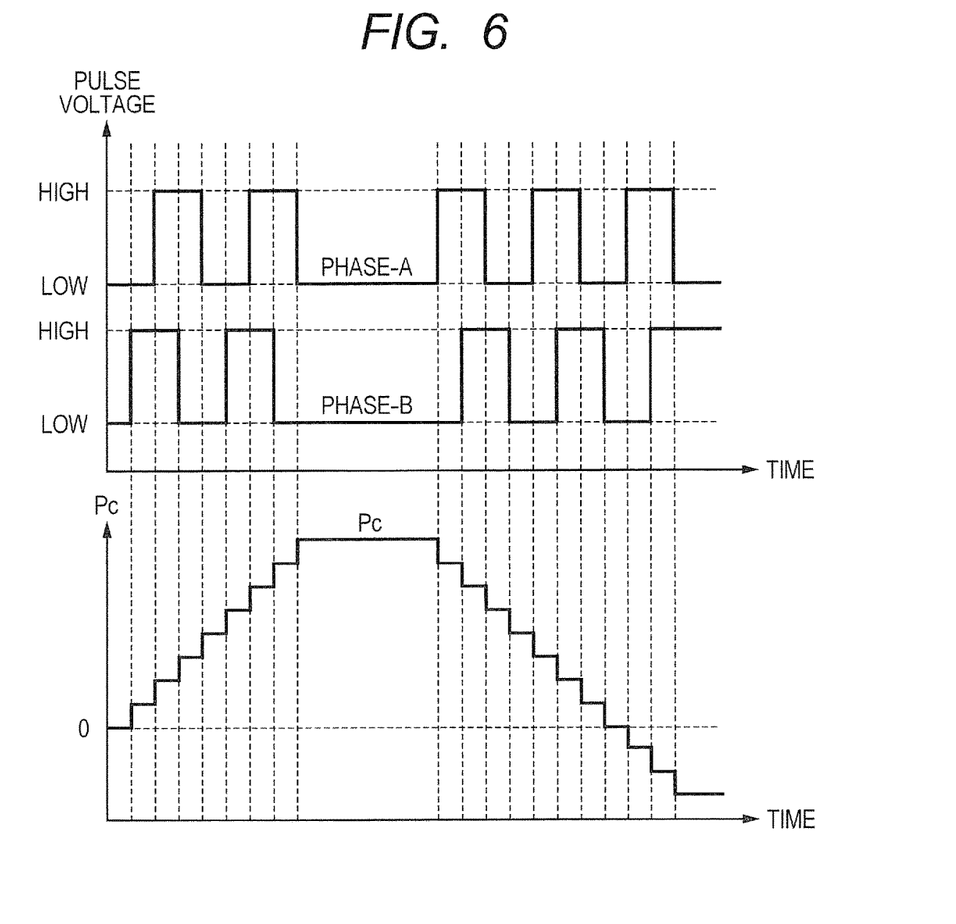
FIG. 6 is a diagram illustrating relationship between a pulse output from the lens apparatus and cumulative pulse counter value Pc.

Firstly, we will describe or define values and terms used in the description of the processing flow. Cumulative pulse counter value Pc is a cumulative value of the number of pulses in the digital pulse train signal output from the lens apparatus 10. As shown in FIG. 6, the cumulative pulse counter value Pc is a value that is increased/decreased in accordance with phase-A and phase-B digital pulse train signals output from the lens apparatus 10. Zoom position Zsp is a zoom position determined by the virtual system 11.

Now, the processing flow will be described.

This flow is started at the time when the zoom lens 102 is shifted to the initial zoom lens position (namely, after the calibration is performed). The zoom lens 102 can be operated by, for example, operating the zoom ring (not shown). The above-described operation is performed as a calibration process in the startup of the virtual system 11. By this calibration process, the zoom position. Zp, the cumulative pulse counter value Pc, and the zoom position Zsp in the virtual system 11 at the initial zoom lens position are brought into agreement with each other.

The processing is started in step S501, and the processing proceeds to step S502.

In step S502, the system-side normalized position determiner 114 sends the maximum position value ZpMax to the lens apparatus 10 through the system-side communication processor 112. Then, the processing proceeds to step S503.

As the maximum position value ZpMax is sent to the lens apparatus 10, the lens apparatus 10 can output a digital pulse train signal of which the total pulse number over the movable range is equal to the maximum position value ZpMax.

In step S503, the system-side normalized position determiner 114 initializes the cumulative pulse counter value Pc of the pulse counter 113 to 0. Then, the processing proceeds to step S504. Thus, at the initial zoom lens position, the cumulative pulse counter value Pc is set to 0 in agreement with the value of the zoom position Zp.

In step S504, the cumulative pulse counter value Pc is increased or decreased as illustrated in FIG. 6. Then, the processing proceeds to step S505. The digital pulse train signal output from the lens apparatus 10 is in agreement with the amount of change of the zoom position Zp thanks to the above-described processing of step S208. Therefore, the zoom position Zp and the cumulative pulse counter value Pc are brought into agreement with each other by the above-described processing of step S503 and S504.

In step S505, the system-side normalized position determiner 114 obtains the cumulative pulse counter value Pc from the pulse counter 113 and sets the zoom position Zsp equal to the cumulative pulse counter value Pc.

By the above-described processing, the value of the zoom position. Zsp determined in the virtual system 11 is in agreement with the zoom position Zp held by the lens apparatus 10, which is smaller than or equal to the maximum position value ZpMax.

As above, the cumulative pulse counter value Pc will not exceed the maximum position value ZpMax. Therefore, the lens apparatus and the virtual system according to this embodiment. can eliminate the problem that the maximum pulse count value of the virtual system is exceeded.

Therefore, the virtual system can determine the position of a movable optical member correctly irrespective of variations in the position detection resolution of the position detector of the lens apparatus or variations in the movable range of the movable optical member.

While the description of this embodiment has been directed to the zoom lens by way of example, the same advantages can also be enjoyed with a focus lens, iris, and optical axis adjustment member such as a shift lens.

[Second Embodiment]

A position output unit and a lens system including the position output unit according to a second embodiment of the present invention will be described with reference to FIG. 7.

In the second embodiment, processing free from calibration will be described.

Figure 7:
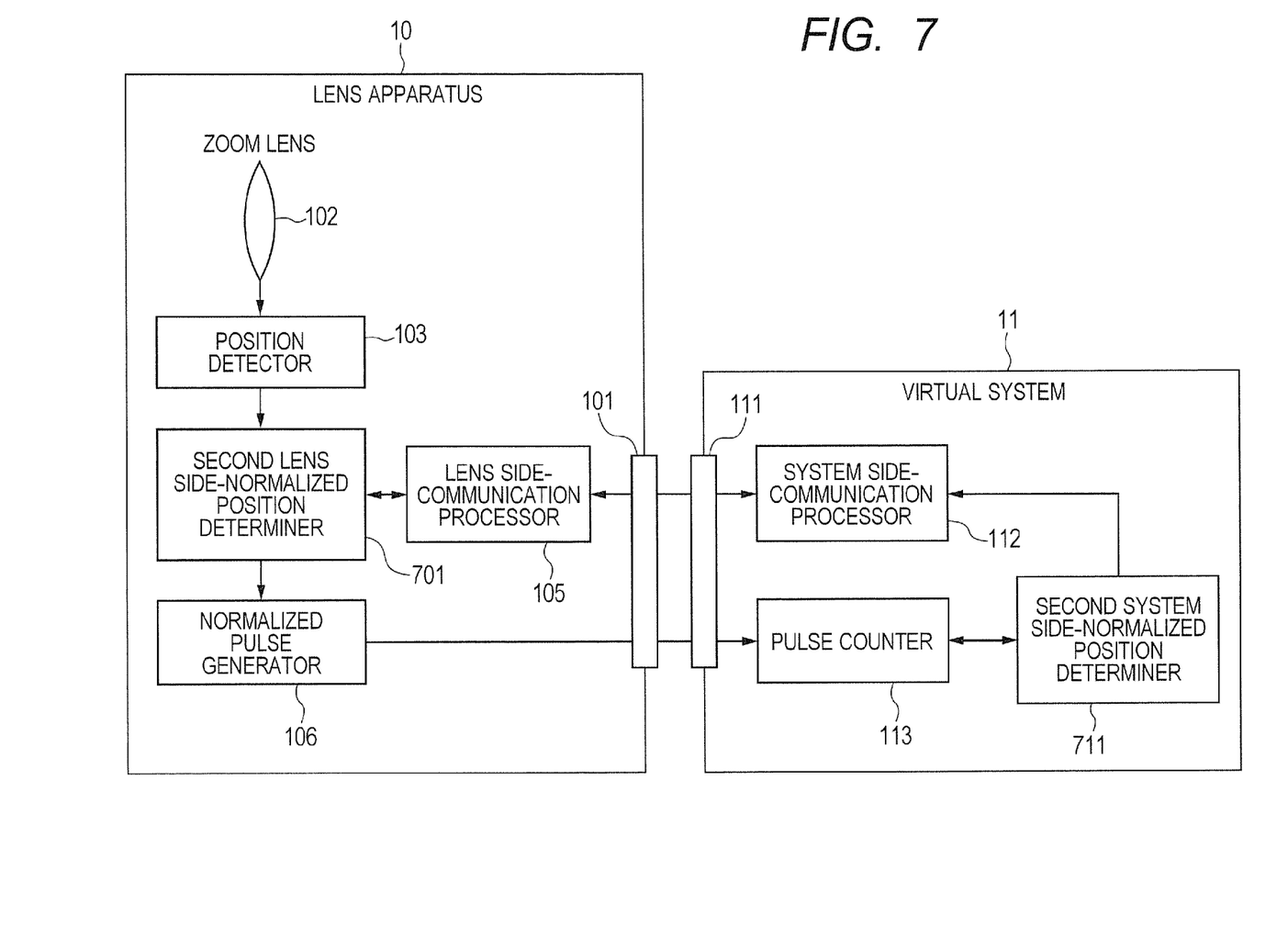
FIG. 7 is a block diagram showing the configuration of a second embodiment.

FIG. 7 is a block diagram of the system of the second embodiment. Components the same as those in FIG. 1 are denoted by the same reference numerals.

The system shown in FIG. 7 differs from the system shown in FIG. 1 only a second lens-side normalized position determiner 701 and a second system-side normalized position determiner 711.

Figure 8:
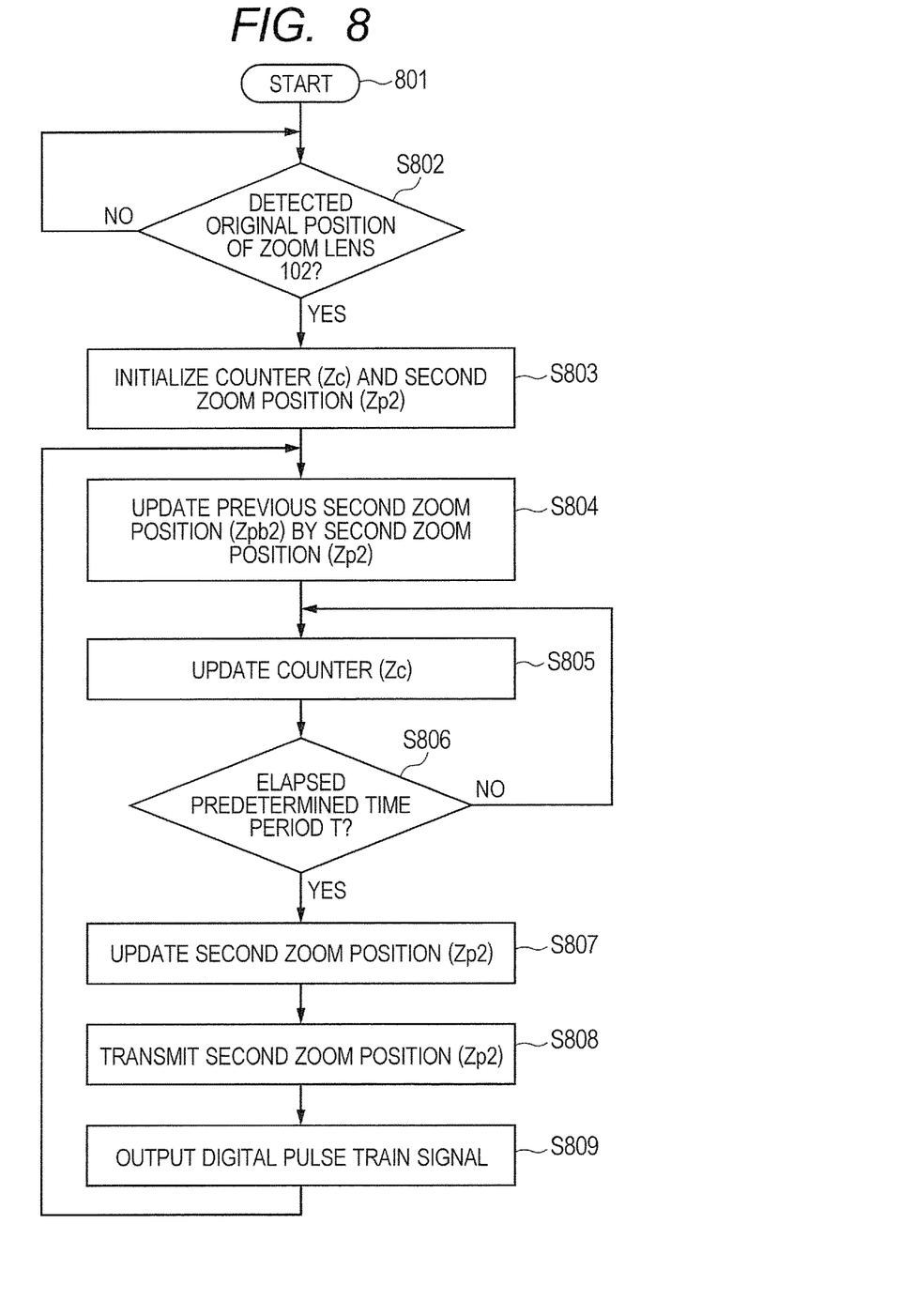
FIG. 8 is a flow chart of processing executed in a lens apparatus according to the second embodiment.

In the following, the flow of processing by which. the lens apparatus 10 according to this embodiment outputs position information about the zoom lens 102 as a digital pulse train signal will be described with reference to FIG. 8.

Firstly, we will describe or define values and terms used in the description of the processing flow. The maximum counter value ZcMax, counter Zc, and predetermined time T are the same as those in the first embodiment. The initial zoom position is the same as that in the first embodiment. In this embodiment, zoom position Zpi is zoom position information sent from the lens-side communication processor 105 to the system-side communication processor 112 by data communication. As in the first embodiment, the data communication is transmission and reception of data sequence performed in a predetermined communication format according to a serial communication standard such as RS-2320 or RS-422, enabling communication of information between the lens apparatus 10 and the virtual system 11. Maximum position value ZpiMax is the maximum value of the zoom position Zpi (i.e. position information) that can be used in the data communication between the lens-side communication processor 105 and the system-side communication processor 112. The maximum position value ZpiMax is determined in advance in the lens apparatus 10 and the virtual system 11. The maximum position value ZpiMax is held in advance in the lens apparatus 10 and the virtual system 11. Second zoom position Zp2 is calculated by the following equation (2):

$$Zp2 = Zc \times ZpMax + ZcMax \qquad (2).$$

The value of the second zoom position Zp2 varies from 0 to the maximum position value ZpiMax, as the zoom lens 102 shifts from the wide angle end to the telephoto end.

Second previous zoom position Zpb2 is a value used in calculation of the amount of change in the second zoom position Zp2 over the predetermined time T in the processing of step S809 described later.

Now, the processing flow will be described.

After the lens apparatus 10 is activated, the processing is started in step S801 and then proceeds to step S802.

In step S802, the second lens-side normalized position determiner 701 executes the processing same as that of step S202 in the first embodiment. When input of an original position detection signal from the position detector 103 is detected, the processing proceeds to step S803.

In step S803, the second lens-side normalized position determiner 701 initializes the values of the counter Zc and the second zoom position Zp2 to 0. Then, the processing proceeds to step S803. Thus, the counter Zc and the second zoom position Zp2 are set to 0 at the initial zoom lens position, after which the counter Zc and the second zoom position Zp2 is increased/decreased with reference to the initial zoom lens position.

In step S804, the normalized pulse generator 106 updates the second previous zoom position Zpb2 so as to make it equal to the second zoom position Zp2. In the first processing after the start, the second previous zoom position Zpb2 is initialized by the second zoom position Zp2. Then, the processing proceeds to step S805.

In step S805, the second lens-side normalized position determiner 701 executes the processing same as that of step S205 in the first embodiment. Then, the processing proceeds to step S806.

In step S806, the normalized pulse generator 106 executes the processing same as that of step S206 in the first embodiment. If it is determined in step S806 that the predetermined time T has elapsed, the processing proceeds to step S807. If it is determined in step S806 that the predetermined time T has not elapsed, the process returns to step S805.

In step S807, the second lens-side normalized position determiner 701 determines the current second zoom position Zp2 according to equation (2). Then, the processing proceeds to step S808.

in step S808, the second lens-side normalized position determiner 701 sends the second zoom position Zp2 the zoom position Zpi to the virtual system 11 through the lens-side communication processor 105.

In step S809, the normalized pulse generator 106 calculates the amount of change ΔZp of the zoom lens 102 over the predetermined time T from the difference between the second zoom position Zp2 and the second previous zoom position Zpb2. Then, the normalized pulse generator 106 outputs a digital pulse train signal corresponding to the amount of change ΔZp of the zoom lens 102 over the predetermined time T to the connector 101. Then, the process returns to step S804.

By the above-described process, the lens apparatus 10 can output a digital pulse train signal of which the total pulse number over the movable range is equal to the maximum position value ZpiMax specified by data communication.

Figure 9:
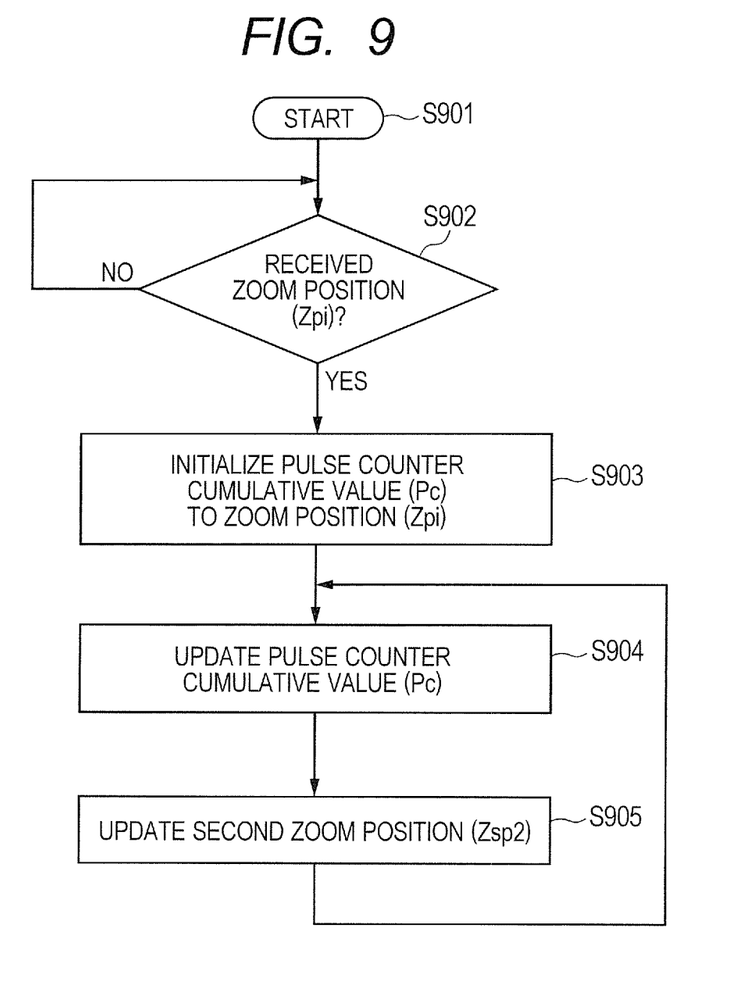
FIG. 9 is a flow chart of processing executed in a virtual system according to the second embodiment.

Next, the flow of processing by which the virtual system 11 according to this embodiment determines the zoom position of the lens apparatus 10 will be described with reference to FIG. 9.

Firstly, we will describe or define values and terms used in the description of the processing flow. Cumulative pulse counter value Pc is the same as that in the first embodiment. Second zoom position Zsp2 is a zoom position determined by the virtual system 11.

Now, the processing flow will be described. While in the first embodiment the processing is started after the calibration process (namely, after the zoom lens is shifted to the initial position), in this embodiment the processing can be started without performing the calibration process.

The processing is started in step S901 and then proceeds to step S902.

In step S902, the system-side communication processor 112 executes the processing of step S902, until it receives the zoom position Zpi from the lens apparatus When the system-side communication processor 112 receives the zoom position Zpi, the system-side communication processor 112 outputs the zoom position Zpi to the second system-side normalized position determiner 711. Then, the processing proceeds to step S903.

In step S903, the second system-side normalized position determiner 711 initializes the cumulative pulse counter value Pc of the pulse counter 113 to the zoom position Zpi. Then, the processing proceeds to step S904. Since the second zoom position Zp2 and the zoom position Zpi are in agreement with each other thanks to the processing of step S808, the second zoom position Zp2 and the cumulative pulse counter value Pc are brought into agreement with each other by the processing of step S903.

In step S904, the processing same as that in step S501 in the first embodiment is executed. Then, the processing proceeds to step S905. The digital pulse train signal output from the lens apparatus 10 is in agreement with the amount of change in the second zoom position Zp2 thanks to the above-described processing of step S809. Therefore, the second zoom position Zp2 and the cumulative pulse counter value Pc are brought into agreement with each other by the above-described processing of S903 and S904.

In step S905, the second system-side normalized position determiner 711 obtains the cumulative pulse counter value Pc from the pulse counter 113 and sets the second zoom position Zsp2 equal to the cumulative pulse counter value Pc.

By the above-described processing, the value of the second zoom position Zsp2 determined in the virtual system 11 is in agreement with the second zoom position Zp2 held by the lens apparatus 10, which is smaller than or equal to the maximum position value ZpiMax.

As above, the cumulative pulse counter value Pc will not exceed the maximum position value ZpiMax. Therefore, the lens apparatus and the virtual system according to this embodiment can eliminate the problem that the maximum pulse count value of the virtual system is exceeded.

Therefore, the virtual system can determine the position of a movable optical member correctly irrespective of variations in the position detection resolution of the position detector of the lens apparatus or variations in the movable range of the movable optical member.

The system according to the second embodiment can eliminate the need of the operation of shifting the position of the zoom lens 102 in the lens apparatus 10 to the wide angle end, which is needed in the system according to the first embodiment. Thus, the virtual system can determine the position of the movable optical member correctly without need for time-consuming calibration process at the startup of the virtual system.

While the description of this embodiment has been directed to the zoom lens by way of example, the same advantages can also be enjoyed with a focus lens, iris, and optical axis adjustment member such as shift lens.

Since the calibration process can be eliminated in the system according to the second embodiment, the movable optical member the position of which is to be represented by a digital pulse train signal can be changed over.

Specifically, the virtual system 11 specifies a target movable optical member by data communication. The lens apparatus 10 sends normalized position information about the target movable optical member to the virtual system 11, generates a digital pulse train signal based on the normalized position information about the movable optical member, and outputs it to the virtual system 11.

Thus, even when the movable optical member the position of which is represented by the digital pulse train signal is changed over, the virtual system can determine the position of the movable optical member correctly by the processing according to this embodiment.

The system configured in this way is advantageous in that it is not necessary to provide connector terminals for connection between the lens apparatus 10 and the virtual system 11 for each of the movable optical members. Therefore, in cases where the position of a movable optical member is to be determined at high frequency, the position of the movable optical member can be determined by the digital pulse train signal. In cases where it is not necessary to determine the position of the movable optical member at high frequency, the position of the movable optical member can be determined using normalized position information obtained through data communication.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-169208, filed Aug. 28, 2015, which is hereby incorporated by reference herein in its entirety.

What is claimed is:

1. An output apparatus comprising:
a detector configured to detect a position of a movable member;
a first processor configured to generate, based on an output from the detector, a pulse train signal including a number of pulses representing a displacement amount of the movable member and to output the pulse train signal; and
a second processor configured to send information of the position of the movable member by data communication,
wherein the first processor is configured to generate the pulse train signal such that a total number of pulses in the pulse train signal corresponding to a displacement amount of the movable member over an entirety of a movable range of the movable member is equal to a maximum value of the position of the movable member of which information is sent by the second processor.

2. The output apparatus according to claim 1,
wherein the detector is configured to output a first pulse train signal including a number of pulses representing the displacement amount of the movable member, and
wherein a number of pulses included in the first pulse train signal output by the detector over the entirety of the movable range of the movable member is more than a number of pulses included in a second pulse train signal output by the first processor over the entirety of the movable range of the movable member.

3. The output apparatus according to claim 2, wherein the first processor is configured to generate the second pulse train signal based on the first pulse train signal output from the detector in a predetermined time.

4. A lens apparatus comprising:
a movable optical member; and
an output apparatus, the output apparatus including:
a detector configured to detect a position of the movable optical member;
a first processor configured to generate, based on an output from the detector, a pulse train signal including a number of pulses representing a displacement amount of the movable optical member and to output the pulse train signal; and
a second processor configured to send information of the position of the movable optical member by data communication,
wherein the first processor is configured to generate the pulse train signal such that a total number of pulses in the pulse train signal corresponding to a displacement amount of the movable optical member over an entirety of a movable range of the movable optical member is equal to a maximum value of the position of the movable optical member of which information is sent by the second processor.

5. A system comprising:
a lens apparatus including:
a movable optical member; and
an output apparatus, the output apparatus including:
a detector configured to detect a position of the movable optical member;
a first processor configured to generate, based on an output from the detector, a pulse train signal including a number of pulses representing a displacement amount of the movable optical member and to output the pulse train signal; and a second processor configured to send information of the position of the movable optical member by data communication, wherein the first processor is configured to generate the pulse train signal such that a total number of pulses in the pulse train signal corresponding to a displacement amount of the movable optical member over an entirety of a movable range of the movable optical member is equal to a maximum value of the position of the movable optical member of which information is sent by the second processor; and a computer configured to receive, from the lens apparatus, the sent information of the position of the movable optical member and the output pulse train signal.

6. The system according to claim 5, wherein the computer includes a third processor configured to obtain a position of the movable optical member based on the output pulse train signal.

7. The system according to claim 5, wherein the computer includes a third processor configured to obtain a position of the movable optical member based on the sent information of the position of the movable optical member.

8. The system according to claim 5, wherein the computer is configured to generate a computer graphics image that is matched with an image formed by the lens apparatus.

9. An output apparatus comprising:
a detector configured to detect a position of a movable member; and a processor configured to generate, based on an output from the detector, a pulse train signal including a number of pulses representing a displacement amount of the movable member, output the pulse train signal, and send information of the position of the movable member by data communication, wherein the processor is configured to generate the pulse train signal such that a total number of pulses by the pulse train signal corresponding to a displacement amount of the movable member over an entirety of a movable range of the movable member is equal to a maximum value of the position of the movable member of which information is sent by the data communication.

10. The output apparatus according to claim 9,
wherein the detector is configured to output a second pulse train signal including a number of pulses representing the displacement amount of the movable member, and wherein a number of pulses by the second pulse train signal output by the detector over the entirety of the movable range of the movable member is more than a number of pulses by the pulse train signal output by the processor over the entirety of the movable range of the movable member.

11. The output apparatus according to claim 10, wherein the processor is configured to generate the pulse train signal based on the second pulse train signal output from the detector in a predetermined time.

12. A lens apparatus comprising:
a movable optical member; and
an output apparatus, the output apparatus including:
a detector configured to detect a position of the movable optical member; and a processor configured to generate, based on an output from the detector, a pulse train signal including a number of pulses representing a displacement amount of the movable optical member, output the pulse train signal, and send information of the position of the movable optical member by data communication, wherein the processor is configured to generate the pulse train signal such that a total number of pulses by the pulse train signal corresponding to a displacement amount of the movable optical member over an entirety of a movable range of the movable optical member is equal to a maximum value of the position of the movable optical member of which information is sent by the data communication.

13. A system comprising:
a lens apparatus including:
a movable optical member; and
an output apparatus, the output apparatus including:
a detector configured to detect a position of the movable optical member; and a processor configured to generate, based on an output from the detector, a pulse train signal including a number of pulses representing a displacement amount of the movable optical member, output the pulse train signal, and send information of the position of the movable optical member by data communication, wherein the processor is configured to generate the pulse train signal such that a total number of pulses by the pulse train signal corresponding to a displacement amount of the movable optical member over an entirety of a movable range of the movable optical member is equal to a maximum value of the position of the movable optical member of which information is sent by the data communication; and a computer configured to receive, from the lens apparatus, the sent information of the position of the movable optical member and the output pulse train signal.

14. The system according to claim 13, wherein the computer includes a processor configured to obtain a position of the movable optical member based on the output pulse train signal.

15. The system according to claim 13, wherein the computer includes a processor configured to obtain a position of the movable optical member based on the sent information of the position of the movable optical member.

16. The system according to claim 13, wherein the computer is configured to generate a computer graphics image that is matched with an image formed via the lens apparatus.

* * * * *